(12) United States Patent
Hultin et al.

(10) Patent No.: US 8,021,709 B2
(45) Date of Patent: Sep. 20, 2011

(54) SYSTEMS AND METHODS FOR SEPARATING PROTEINS FROM CONNECTIVE TISSUE

(75) Inventors: Herbert O. Hultin, Rockport, MA (US); Stanley H. Hultin, legal representative, Rockport, MA (US); Christopher Riley, Washington, DC (US)

(73) Assignee: MPF, Inc., Kensington, NH (US)

( * ) Notice: Subject to any disclaimer, the term of this patent is extended or adjusted under 35 U.S.C. 154(b) by 569 days.

(21) Appl. No.: 11/994,350

(22) PCT Filed: Jun. 26, 2006

(86) PCT No.: PCT/US2006/025020
§ 371 (c)(1),
(2), (4) Date: Dec. 31, 2007

(87) PCT Pub. No.: WO2007/046891
PCT Pub. Date: Apr. 26, 2007

(65) Prior Publication Data
US 2008/0214792 A1    Sep. 4, 2008

Related U.S. Application Data

(60) Provisional application No. 60/696,071, filed on Jul. 1, 2005.

(51) Int. Cl.
*A23J 1/04* (2006.01)
*A23J 1/02* (2006.01)

(52) U.S. Cl. .......... 426/657; 426/574; 426/643; 452/10; 241/68; 241/74

(58) Field of Classification Search .................. 426/574, 426/657, 643; 452/10; 241/68, 74
See application file for complete search history.

(56) References Cited

U.S. PATENT DOCUMENTS

| | | | |
|---|---|---|---|
| 3,028,243 A | | 4/1962 | Robertson et al. |
| 3,705,040 A | | 12/1972 | Bynagte |
| 3,705,547 A | * | 12/1972 | Laurie et al. .................. 100/121 |
| 3,741,772 A | | 6/1973 | McFarland |
| 4,023,735 A | * | 5/1977 | Schnell ............................ 241/22 |
| 4,279,058 A | * | 7/1981 | Ivey ................................ 452/139 |
| 4,402,987 A | | 9/1983 | von Lersner et al. |
| 4,770,610 A | * | 9/1988 | Breckner ......................... 417/12 |
| 4,871,560 A | | 10/1989 | Brokans |
| 5,167,977 A | * | 12/1992 | Gamay ........................... 426/417 |
| 5,223,301 A | | 6/1993 | Kanda et al. |
| 5,725,897 A | * | 3/1998 | Schaefer et al. ............... 426/417 |
| 6,005,073 A | | 12/1999 | Hultin et al. |
| 6,136,959 A | | 10/2000 | Hultin et al. |
| 6,288,216 B1 | | 9/2001 | Hultin et al. |
| 6,451,975 B1 | | 9/2002 | Hultin et al. |
| 6,855,364 B2 | | 2/2005 | Kelleher et al. |
| 7,033,636 B2 | | 4/2006 | Kelleher |
| 7,160,567 B2 | | 1/2007 | Kelleher et al. |
| 7,163,707 B2 | | 1/2007 | Kelleher et al. |
| 7,473,764 B2 | | 1/2009 | Hultin et al. |
| 7,556,835 B2 | | 7/2009 | Hultin et al. |
| 2004/0067551 A1 | | 4/2004 | Hultin et al. |

FOREIGN PATENT DOCUMENTS

| | | |
|---|---|---|
| EP | 0848911 B2 | 1/2004 |
| WO | 2007018585 A2 | 2/2007 |
| WO | 2007053248 A1 | 5/2007 |

OTHER PUBLICATIONS

Scopes, R.K. The Influence of Post-Mortem Conditions on the Solubilities of Muscle Proteins. Biochem. J. (1964) 91(1), 201-207.
Hilderbrand, Jr., K.S. Surimi: Some Observations on Trawler Production. Oregon State U. Extension Service, Special Report 762, Feb. 1986, 1-25.
International Search Report dtd. Sep. 20, 2007 for PCT/US06/25020. Applicant: MPF, Inc.
Written Opinion dtd. Sep. 20, 2007 for PCT/US06/25020. Applicant: MPF, Inc.
International Preliminary Report on Patentability (Chapter I) dtd. Jan. 10, 2008 for PCT/US06/25020. Applicant: MPF, Inc.
Park, J.W. et al. Manufacturing of Surimi from Light Muscle Fish. In: Park, J.W. Surimi and Surimi Seafood, Marcel Dekker Inc. (2000), pp. 23-58.

* cited by examiner

*Primary Examiner* — David Lukton
(74) *Attorney, Agent, or Firm* — Burns & Levinson, LLP; Janine M. Susan, Esq.; Marlo Schepper (57) ABSTRACT

Methods and systems for separating muscle tissue from connective tissue are provided, in which animal tissue containing both muscle tissue and connective tissue is subjected to stress, and muscle proteins are separated from the connective tissue. Slurries of separated myofibrillar protein are also provided.

36 Claims, 6 Drawing Sheets

FIG. 6B

SYSTEMS AND METHODS FOR SEPARATING PROTEINS FROM CONNECTIVE TISSUE

CROSS-REFERENCE TO RELATED APPLICATIONS

This application is a U.S. National Stage Application under 35 U.S.C. §371 of International Application Serial No. PCT/US2006/25020 filed Jun. 26, 2006, which in turn claims priority to U.S. Provisional Application No. 60/696,071 filed Jul. 1, 2005.

FIELD OF THE INVENTION

The invention relates to muscle protein processing.

BACKGROUND

Presently, there is an interest in expanding the use of muscle proteins as food because of their functional and nutritional properties. Better use of these materials would be particularly important with low-value raw materials for which there is currently little or no human food use, for example, fatty pelagic fish and deboned muscle tissue from fish, poultry, and meat processing. The use of these materials has been hampered because of the loss of functionality of the proteins during processing and/or difficulties in handling the proteins. For example, many current processes for separating protein from connective tissue first dissolve the muscle protein and then separate the muscle protein from the connective tissue. However, the dissolved proteins may have undesirable properties, such as a tendency to foam when exposed to air and agitated, e.g., as by centrifugation, and/or a tendency to react or denature when in solution.

SUMMARY OF THE INVENTION

The invention is based, at least in part, on the discovery that muscle protein can be separated from animal tissue on the basis of its lower strength than that of connective tissue. It has also been found that (1) muscle tissue hydrates more rapidly in the presence of water than does connective tissue; and (2) the tensile strength of muscle tissue falls with hydration. Muscle tissue is separated from connective tissue on the basis of these properties by hydrating animal tissue that includes muscle and connective tissue to weaken the muscle tissue, and then subjecting the animal tissue to low shear environment with tensile stress sufficiently strong to tear the muscle, both from the connective tissue and from itself, but sufficiently weak to avoid tearing the connective tissue. In this fashion, the muscle tissue is torn from the connective tissue and reduced in particle size until it can be readily separated from the connective tissue, for example, by means of a screen. The weakening of the muscle tissue described herein can be hastened and enhanced by raising or lowering the pH of the slurry above that of the natural muscle tissue.

In one aspect, the invention features methods of separating muscle protein from connective tissue. A slurry is created by placing animal tissue, which includes at least muscle tissue and connective tissue, in an aqueous solvent. The slurry is then accelerated in a low shear environment, e.g., an environment that subjects the slurry to little shear stress, but enables sufficient acceleration to provide a level of tensile stress that is below a level where a substantial fraction of connective tissue will tear and no less than a level where a substantial amount of tearing occurs in a muscle tissue. Muscle protein is then separated from the connective tissue.

Embodiments may include one or more of the following features.

The acceleration can be continuous acceleration in a low shear environment. Following the creation of the slurry, but prior to the acceleration, the slurry can remain relatively undisturbed for a period of time, e.g., at least about 5 minutes, sufficient to allow the muscle tissue to partially hydrate. Following the creation of the slurry, but prior to acceleration, fat content of the animal tissue can be reduced, e.g., by adjusting pH of the slurry to about an isoelectric point of muscle protein (e.g., to about 5.5), e.g., by reducing temperature of the slurry to about −1° C. and/or, e.g., by bubbling air into the slurry. The aqueous solvent can be water. The pH of the aqueous solvent can be between about 5.0 and 9.5.

Low shear acceleration can be created by pumping the slurry through a pipe comprising a constriction. The slurry can be housed within a tank and the pipe can be configured to circulate the slurry out of the tank, through the constriction, e.g., a reduction in an inner diameter of the pipe, e.g., a narrowing, a baffle, or a valve (e.g., a ball valve), and back into the tank.

The steps of accelerating the slurry can be repeated several times, e.g., 2, 3, 4, 5, 6 or more times.

The protein can be separated by introducing the slurry into a refiner that includes a screen configured to allow a substantial portion of the protein to pass through the screen and to prevent a substantial amount of the connective tissue from passing through the screen. The screen can be formed of a mesh having apertures, e.g., no larger than about 5 mm, e.g., between about 0.25 mm and about 3.0 mm, e.g., between about 0.5 mm and 1.5 mm or between about 0.25 mm and 0.5 mm. The refiner can house a paddle configured to rotate within a cylindrical screen at a speed of e.g., no more than about 1000 RPM, e.g., no more than about 750 RPM, 500 RPM, 250 RPM, 100 RPM, or 60 RPM.

The animal tissue can include fish, shellfish, squid, poultry, beef, lamb, or pork tissue.

Prior to creating the slurry, bones can be removed from animal tissue containing muscle tissue and connective tissue to form deboned animal tissue. The step of creating the slurry can include placing deboned animal tissue into an aqueous solvent for at least 30 minutes.

The low shear, high acceleration environment can be controlled to provide a level of tensile stress so that a substantial fraction of the connective tissue will not tear, and a substantial fraction of the muscle tissue will tear. Shear can also be controlled to prevent denaturation of substantially all of the muscle protein.

In a another aspect, the invention features methods of processing protein. Muscle protein is first separated from animal tissue, and the protein is subsequently solubilized. At least 50% of the separated muscle protein remains undissolved during the separation step.

Embodiments may include one or more of the following features.

Substantially all of the muscle protein can remain undissolved during the separation step. The separated muscle protein can be solubilized by raising the pH of a slurry comprising an aqueous solvent and the protein to a point at which at least 75% of the separated muscle protein dissolves, e.g., to a pH of at least about 10.5. The separated muscle protein can be solubilized by lowering the pH of a slurry comprising an aqueous solvent and the muscle protein to a point at which at least 75% of the separated protein dissolves, e.g., to a pH of between about 2.5 and about 3.5.

In still another aspect, the invention features a fluid composition containing at least water and insoluble protein, wherein at least about 50% of the insoluble protein is in myofibrillar filament form and the fluid includes substantially no connective tissue.

Embodiments may include one or more of the following features.

The protein can include myosin. At least about 75% of the myosin can be in myofibrillar filament form. The composition can include less than about 10% by weight of connective tissue, relative to the amount of protein in the slurry. The composition can include less than about 4% by weight of connective tissue, relative to the amount of protein in the slurry.

In another aspect, the invention features systems for separating muscle protein from connective tissue. The systems include a first reservoir; a first pipe in fluid communication with the reservoir and having a constriction therein; a pump configured to pump fluid from the reservoir through the pipe; and a separation device in fluid communication with the first reservoir.

Embodiments of the systems may include one or more of the following features.

The systems can also include a second reservoir, a second pipe in fluid communication with the second reservoir and the separation device and having a constriction therein, and a second pump configured to pump fluid from the second reservoir through the second pipe. The first pipe can be connected at an outlet of the first reservoir and at an inlet of the first reservoir and configured to recycle fluid passed from the outlet of the first reservoir through the first pipe and through the inlet back into the first reservoir. The pump should be a low shear pump and can be a positive displacement pump, a centrifugal pump, a jet pump, a peristaltic pump, a rotary pump, a diaphragm pump, a vane pump, or a reciprocating pump. The constriction can include a reduction in an inner diameter of the pipe. The constriction can be a baffle or a valve, e.g., a ball valve. The separation device can include a refiner. The refiner can include a screen having apertures, e.g., no larger than about 2 mm, e.g., no larger than about 0.25 mm. The refiner can include a paddle configured to rotate within a cylindrical screen. The paddle can be pitched to move material within the cylindrical screen from a first end to a second end.

In yet another aspect, the invention features methods of increasing the protein content of meat. A slurry is created by placing animal tissue including muscle tissue in an aqueous solvent. The slurry is accelerated in an environment that subjects the slurry to little shear stress, but enables sufficient acceleration to provide a level of tensile stress that is no less than a level where a substantial amount of tearing occurs in muscle tissue, to reduce the particle size of muscle tissue. The slurry is combined with meat.

Embodiments may include one or more of the following features.

The slurry can be combined with muscle tissue by injecting the slurry into muscle tissue. At least about 50% of the insoluble protein in the slurry can be in myofibrillar filament form. The animal tissue can be further ground prior to placing it in the aqueous solvent. The aqueous solvent can contain substantially no salts.

Embodiments of the systems and methods herein may include one or more of the following advantages.

In the new methods, the proteins, mainly muscle proteins, are separated from connective and other tissue prior to solubilization of the proteins, which eliminates the need for such separation once the proteins are solubilized. The separation of the muscle protein is more efficient than current methods, having a greater yield of proteins and/or a lower level of connective tissue or other undesirable tissue. The separated proteins are subject to less foaming, shear and/or heat, resulting in less denaturation than in conventional techniques. A substantial amount of the protein, for example, a substantial amount of myosin, is in its normal myofibrillar filament form, that is, undenatured. The new methods also enable differing muscle types to be separated from each other, where the muscle types differ in tensile strength and/or rate of hydration in the presence of water.

As used herein, "low shear environment" is an environment free from perturbation by a shearing mechanism, e.g., a blade or a propeller. A low shear environment can be within, for example, a container or vessel or a lumen of a cylinder, e.g., a pipe described herein. Low shear acceleration can be generated by accelerating a slurry described herein using a low shear pump, e.g., any piston pump. Skilled practitioners will appreciate that the level of low shear and high tensile stress depends on the raw materials used, for example, a low shear environment for beef tissue includes a different shear level than a low shear environment for fish tissue.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features, objects, and advantages of the invention will be apparent from the following detailed description and drawings, and from the claims.

DESCRIPTION OF DRAWINGS

Like reference symbols in the various drawings indicate like elements.

DETAILED DESCRIPTION

General Methodology

Animal tissue including muscle tissue is placed in an aqueous liquid, resulting in hydration of at least some of the muscle tissue. The animal tissue is subject to stress, e.g., tensile stress, for example, tensile stress in a low shear environment. The stress is selected to be sufficiently strong to tear the muscle, both from any connective tissue and from itself, but sufficiently weak to avoid tearing connective tissue. Muscle tissue is torn from the connective tissue and reduced in particle size until the differential in particle size between the muscle tissue and connective tissue is large enough to permit separation of muscle tissue from connective tissue by a separation device, for example, a screen. The application of stress in a low shear environment and the separation of muscle from connective tissue can be carried out in a variety of ways and by a variety of systems as discussed in greater detail below. The key is to selectively break down the muscle tissue into small particles, while leaving as much of the connective tissue intact as possible. Thereafter, they can be separated by size.

Typically, without intending to limit the invention and for descriptive purposes only, the methods described herein can be analogized to attempting to separate spaghetti noodles from rubber bands. A mixture of spaghetti noodles and rubber bands is placed in water, wherein the spaghetti hydrates. When this mixture is accelerated in a low shear environment to produce tensile stress, the spaghetti breaks into smaller and smaller pieces, while the rubber bands might appear generally the same. After a few cycles of such acceleration, the spaghetti is in very small pieces, e.g., so small that they are not visible to the naked eye, and the mixture appears as a syrupy substance (containing tiny spaghetti pieces) with relatively undisturbed rubber bands. This mixture is then passed through a screen with holes large enough for spaghetti particles to pass through, but small enough to exclude the rubber bands. The separated spaghetti particles can be subsequently solubilized.

Figure 1:
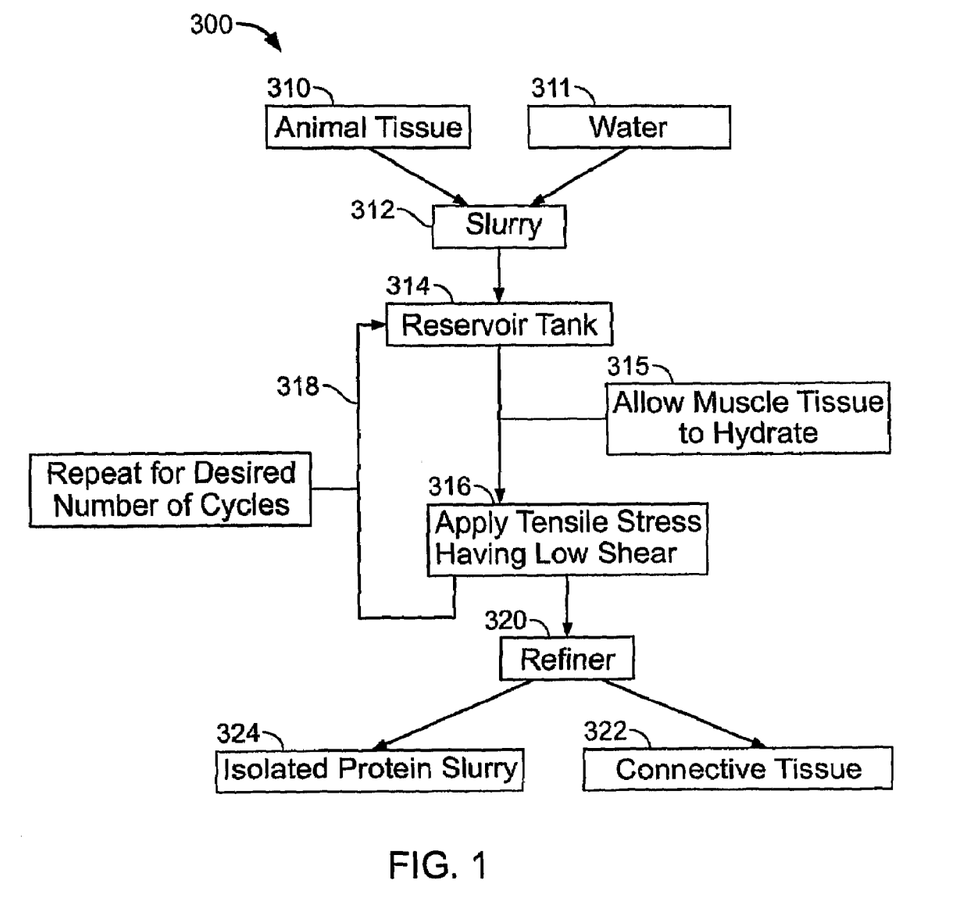
FIG. 1 is a flow chart of a method embodiment.

One embodiment of method 300 is illustrated in FIG. 1, where the separation of muscle tissue from connective tissue begins by combining animal tissue 310 and an aqueous liquid 311, e.g., water, in a reservoir tank 314 to create a slurry 312. The animal tissue may include proteins (e.g., muscle proteins), connective tissue, and other undesirable tissues, for example, small bones, cartilage, or blood. Any aqueous solvent, e.g., buffered water, can be employed as the aqueous liquid. The aqueous liquid and animal tissue are in certain embodiments mixed in a ratio of at least 0.1 part water to 1 part animal tissue (e.g., at least 1 part water to 1 part animal tissue, at least 1.5 parts water to 1 part animal tissue, at least 2 parts water to 1 part animal tissue, at least 5 parts water to 1 part animal tissue, at least 10 parts water to 1 part animal tissue, at least 25 parts water to 1 part animal tissue, at least 50 parts water to 1 part animal tissue, or at least 100 parts water to 1 part animal tissue). Generally, a higher amount of water results in a faster hydration of the tissue, while a lower amount of water requires less dewatering and generates less waste. Ratios of between 1 and 5 parts water to 1 part animal tissue generally provide acceptable hydration speeds and waste levels.

The pH of the aqueous solvent is generally selected to avoid foaming that might occur if a substantial amount of protein were to dissolve, and is typically between about 4.2 and about 9.5 (e.g., between about 5.0 and 8.5, e.g., between about 5.0 and about 7.5, between about 5.5 and about 7.0). In certain embodiments, the slurry naturally falls within an acceptable pH range, and no further pH control is required. The slurry contains undissolved protein, e.g., muscle protein, and insoluble material, e.g., connective tissue, and may, in some embodiments, additionally contain solubilized material, e.g., solubilized proteins.

The slurry 312 in step 315 may, in certain embodiments, be allowed to remain relatively undisturbed for a period of time sufficient to permit at least some hydration of the muscle tissue (e.g., at least about 1, 2, 5, 10, 20, 30, 40, 50, 60, 70, 80, or 90 minutes). In other embodiments, the slurry is processed immediately, i.e., the slurry is not allowed to remain undisturbed for any extended period of time. The slurry 312 may, in certain embodiments, be stirred to promote water uptake by the muscle tissue. The temperature of the water is selected to prevent the degradation of the protein filaments while permitting water uptake by the muscle fibers, and can be, for example, no less than about 0° C. (e.g., no less than about 10° C., 20° C., 30° C., 40° C., 50° C., 60° C., 70° C., 80° C., 90° C., 100° C., 120° C., or 140° C.). As the muscle tissue hydrates, the tensile strength of the muscle tissue decreases, resulting in an increase in the differential between the tensile strength of the muscle tissue and the tensile strength of the connective tissue.

In step 316, the slurry 312 is subjected to a tensile stress with minimal shear, e.g., by rapidly accelerating the slurry (such as, for example, by pumping the slurry through a pipe having a constriction, by stirring the slurry, e.g., with a mixer such as, for example, an orbital mixer, or by agitating the slurry, e.g., mechanically or ultrasonically). The tensile stresses are controlled so as to be below a level where a substantial fraction (e.g., over 80%) of connective tissue will fail (e.g., tear), but at or above a level where a substantial fraction (e.g., over 80%) of the muscle tissue will fail (e.g., tear). A low shear, high tensile stress environment can be generated, e.g., by accelerating the slurry through a pipe, e.g., with smooth walls, with a low shear pump, e.g., a piston pump. A skilled practitioner will appreciate that a level of shear and tensile stress can be adjusted depending on the type of raw materials used.

A visual test can be used to determine whether the amount of tensile stress applied is sufficient. Initially, the slurry observed by naked eye in the reservoir tank contains tissue with large visible pieces of muscle and small pieces of connective tissue, e.g., tendons. Once the tissue is subjected to sufficient tensile stress, for a sufficient length of time, the appearance of the slurry changes to a watery or syrupy solution (containing reduced muscle protein) with small pieces of connective tissue. Thus, observing the slurry after subjecting it to tensile stress, but before separating the muscle protein from the connective tissue, can be used to determine whether the applied tensile stress is sufficient.

In addition, the amount of tensile stress applied can be measured with a fiber optical stretch meter and/or by monitoring energy or work applied to a certain amount of raw material. For example, the amount of energy consumed or work done can be measured by monitoring additional amperage drawn by a pump when either a valve is closed or a constriction imposed. The level of tensile stress sufficient to process tissue depends on the type of muscle present, e.g., the amount of tensile stress (as measured by applied energy or work) is about four times higher for processing beef muscle than for processing fish muscle. The level of tensile stress also depends on the length of time the stress is applied, e.g., the longer the time, the lower the stress level that is required. A skilled practitioner will be able to adjust tensile stress and/or applied energy as needed for a given application.

Where a pipe with a constriction is employed, the flow speeds required to achieve the desired forces will depend on the internal diameters of the pipe and the configuration of the constriction. Generally, for example, where a reduction fitting is employed, the velocity $v_2$ of the fluid in the reduced diameter section can be determined by the equation:

$$v_2 = (r_1^2 / r_2^2) v_1$$

where:

$r_1$ = the internal radius of the pipe, $r_2$=the internal diameter of the smaller end of the reduction fitting, and $v_1$=the velocity of the fluid in the larger pipe $v_2$=the velocity of the fluid in the smaller pipe.

For example, in a system running at 20 gallons per minute ("GPM"), the initial velocity would be 0.9 ft/sec through a 3-inch ID pipe. When the fluid passes through a constriction made up of a 3-inch long reducer down to a 1-inch ID pipe, in a linear distance of two inches, the velocity of the fluid increases to 8 ft/sec, in that the fluid spends, on average 0.09 seconds in the reducer described at a flow of 20 GPM, the average acceleration in the direction of flow is 80 ft/sec$^2$. Acceleration can be controlled by altering the extent and/or length of the constriction and/or the flow rate. It should be noted that the acceleration shown in the above calculation is a fraction of the average total acceleration caused by the restriction, as acceleration exists in directions other than the positive direction of flow. The magnitude of the forces that the solid particles are subjected to can be altered by changing the size and shape of the restriction or by increasing or decreasing the rate of flow. For example, the system described above could be made to run, e.g., at least 5 ft/sec$^2$ acceleration, by running it at a flow rate of 5 GPM. Alternatively, a high acceleration of, e.g., 504 ft/sec$^2$ could be achieved at 50 GPM.

The upper limit of acceleration will, in certain embodiments, be the level at which the temperature of the slurry is raised above a desired limit, e.g., a temperature above which denaturation of the muscle protein occurs. In certain embodiments, using a sufficient number of cycles removes the need for a lower limit on acceleration, e.g., acceleration can be lower than 5 ft/sec$^2$. Extremely gentle acceleration may be needed to separate weak forms of connective tissue, e.g., membranes. A higher level of acceleration may be needed to separate coarse tissue, e.g., beef. Skilled practitioners will appreciate that the acceleration level needs to be adjusted according to the type of tissue used and the total time the tensile stress is to be applied. In one embodiment, all acceleration can occur in the area of the reduction fitting.

In certain embodiments, a refrigeration apparatus may be placed downstream of the area of acceleration to remove any generated heat and potentially limit denaturation and/or other heat-related problems. Of course, the stress associated with acceleration is not the only stress applied by the system. Turbulence contributes to the stress applied, both the turbulence of passing through the conduit and the increase in turbulence resulting from the constriction, along with any elbows or other changes in pipe direction. In general, the amount of energy put into the system can be measured or approximated by changes in the amperage drawn by the pump motor or by directly measuring the pressure drop across the constriction, along with the flow rate. Work delivered to the slurry per unit time can be kept constant or can be varied over the course of a batch operation. Generally, the rate of acceleration or work can be controlled by monitoring the amperage and/or flow rate and/or the pressure drop, and adjusting the pump speed and/or the cross-sectional area of the constriction. The system described herein is flexible, in that its operation can be controlled by adjusting flow rate, restriction size, and/or time the slurry spends in various compartments.

Upon being subjected to high tensile and low shear force, for example, resulting from the acceleration of the aqueous solvent and slurry, the weaker muscle tissue will begin to break into smaller pieces, while the connective tissue will tend to remain substantially intact. Further, the muscle tissue will break away from the connective tissue, effecting a separation of the two components. Such is illustrated in FIGS. 2A-2D in the context of pumping the slurry through a restriction fitting in a pipe. An animal tissue fragment 200 made up of a piece of connective tissue 202 and a piece of muscle tissue 204 is being pumped through a pipe 208 having a reduction fitting 210 located in the pipe 208. As the animal tissue fragment 200 approaches the reduction fitting 210 in FIG. 2A, the fluid flow rate begins to increase. The increase in flow rate affects the downstream end 205 of the animal tissue fragment 200 prior to its affecting the upstream end 206 of the animal tissue fragment 200, pulling the downstream end 205 along and stretching the animal tissue fragment 200 in the direction of fluid flow.

Figure 2A:
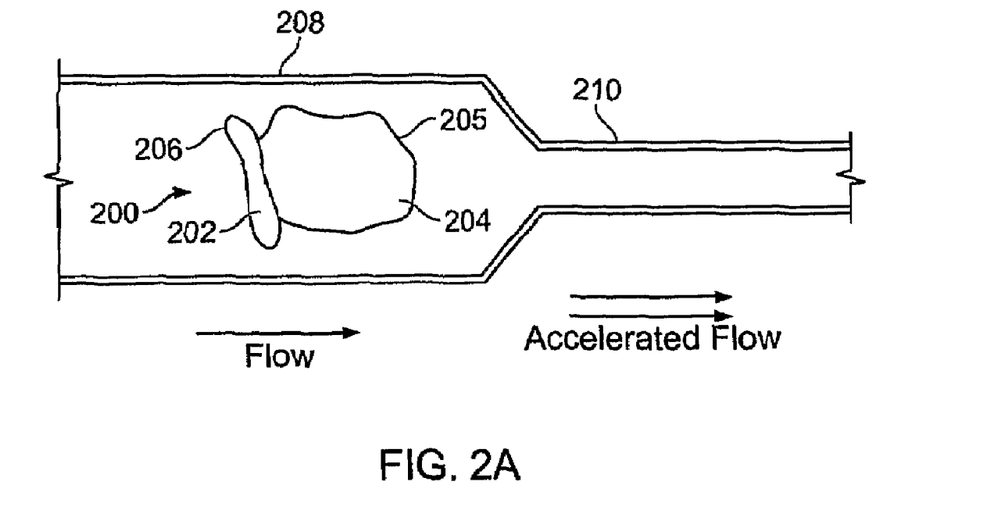
FIGS. 2A-2D are a series of schematic illustrations of a method embodiment.
Figure 2B:
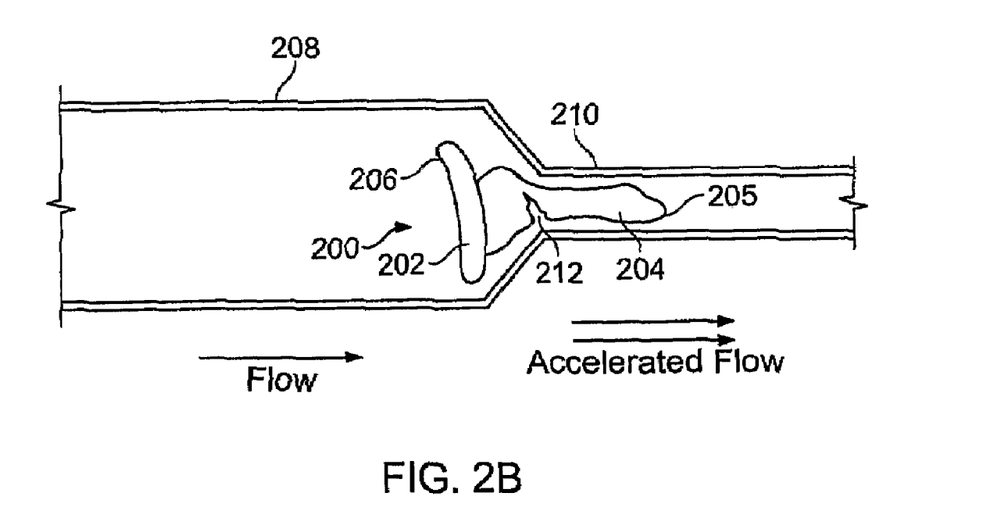
Figure 2C:
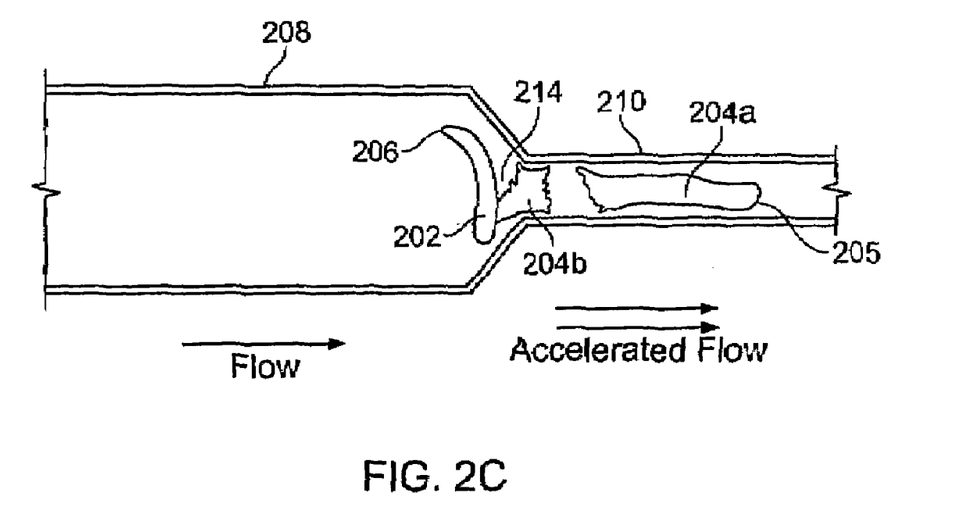
Figure 2D:
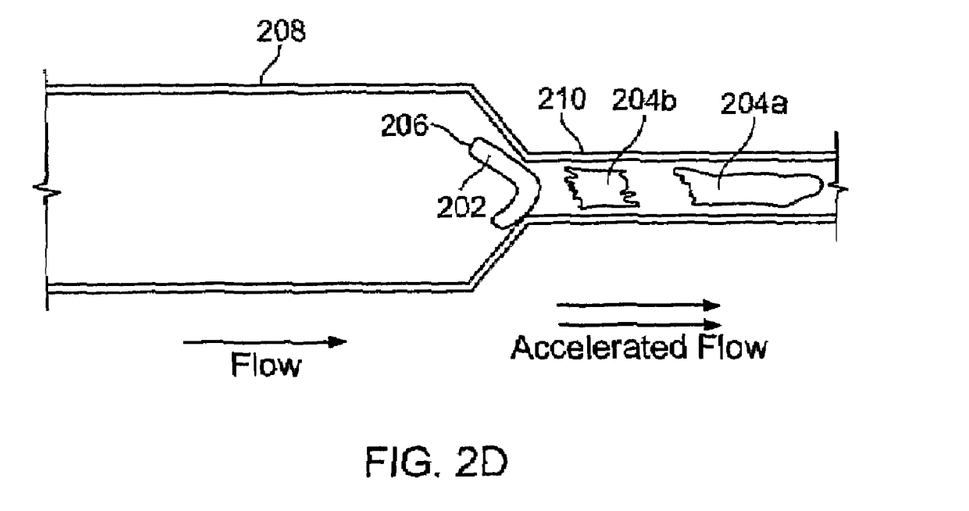

When the change in flow rate is of sufficient force, this stretching results in a tear 212 in the muscle tissue, seen in FIG. 2B, and eventually to the separation of the muscle fragment 204 into two smaller muscle tissue fragments 204a and 204b, as illustrated in FIG. 2C. The acceleration forces also result in a tear 214 between the muscle tissue fragment 204b and the connective tissue fragment 202, which eventually becomes complete, resulting in muscle tissue fragment 204b pulling loose from connective tissue fragment 202, illustrated in FIG. 2D. Thus, the initial animal tissue fragment 200, which included both muscle tissue and connective tissue, is broken into two smaller fragments of muscle tissue (204a and 204b) and a separate fragment of connective tissue 202. Each smaller fragment has a higher surface-to-volume ratio than the larger fragment 200, which can facilitate further hydration (by exposing new surfaces to water).

Referring again to FIG. 1, the slurry 312 can then be directed into a reservoir tank in step 318. The reservoir tank may be the same reservoir tank 314 from which it was pumped or may be a different reservoir tank. The slurry can then be allowed to hydrate further, and subjected to further high tensile and low shear force by being accelerated through a pipe having a constriction (step 316) for a second time. The hydration and acceleration steps (e.g., steps 315, 316 and 318) can be repeated as often as necessary to achieve the desired results. For example, the hydration and acceleration steps can be run once, or no less than twice (e.g., no less than three times, no less than four times, no less than five times, no less than six times, no less than seven times, no less than eight times, no less than nine times, no less than ten times, no less than fifteen times, no less than twenty times). Additional animal tissue and/or aqueous solvent may be added at any of the steps, e.g., water can be added to replace water taken up by the muscle tissue, particularly where the water to animal tissue ratio is initially small, e.g., 0.5 parts water to 1 part animal tissue. Additionally, the hydration times and temperature and the amount of acceleration forces can be held constant throughout, or can be adjusted from cycle to cycle. For example, the hydration times for subsequent hydration steps can be made shorter, as the surface area of the muscle tissue increases.

As the muscle tissue breaks into smaller fragments, the surface area to volume ratio increases, as discussed above. This increase in surface area enables further hydration of the muscle tissue (by exposing new surfaces), further weakening the muscle tissue and enabling the muscle tissue to break down into smaller and smaller fragments or particles.

The slurry 312 can then be pumped from the reservoir 314 to a separation device, here a refiner 320, where the insoluble material, e.g., connective tissue 322, is separated from the slurry, leaving an separated (i.e., isolated) protein slurry 324, which can be further processed as desired. When so desired, the muscle tissue particles can be reduced in size (in steps 315, 316 and 318) until the muscle tissue takes on a paste-like consistency. The refiner can include a screen, e.g., a cylindrical screen, with holes of, for example, from about 0.25 mm to about 2 mm. The mesh size is selected to exclude substantially all of the connective tissue, as the paste-like slurry of muscle tissue particles will readily pass through a small mesh. Skilled practitioners will appreciate which mesh size is appropriate for a given application.

Fragments of the connective tissue, which have a higher tensile strength than the muscle tissue and which hydrate and lose tensile strength at a lower rate than the muscle&tissue, remain sufficiently large that they will not readily pass through the small mesh screen in the refiner but instead will be pushed out of the refiner terminal end by the paddles, thus separating the protein, mainly muscle protein, from the connective tissue. In some embodiments, the hydration time, the acceleration force, and the number of cycles can be adjusted to reduce the muscle tissue to an extremely small size, whereby the refiner can be replaced with a rotary or a tangential screen that separates the protein, mainly muscle protein, from the connective tissue without the use of paddles.

In-Line Continuous Systems

Figure 3:
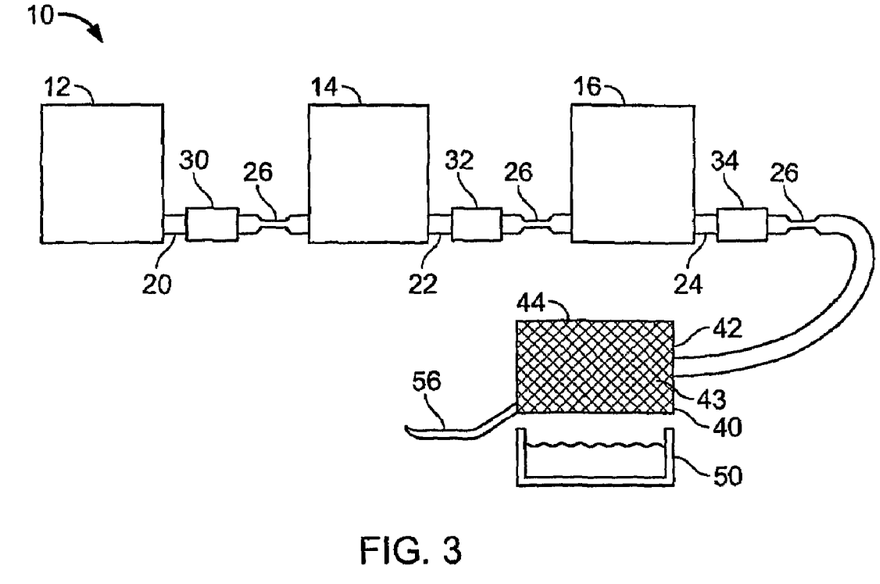
FIG. 3 is a schematic view of an embodiment of a system as described herein.

An embodiment of a system for separating muscle protein from connective tissue is illustrated in FIG. 3. The system 10 includes a series of reservoir tanks 12, 14, and 16. Pipes 20 and 22 lead from the reservoir tank 12 to the reservoir tank 14 and from the reservoir tank 14 to the reservoir tank 16, respectively. The pipes 20 and 22 have pumps 30 and 32, respectively, for pumping fluid through the pipes 20 and 22. The pumps may be, for example, positive displacement pumps, such as, e.g., reciprocating pumps, rotary pumps, or diaphragm pumps, and may be located anywhere in the system (e.g., in-line within the pipe or in a reservoir tank) where they can effect movement of fluid through the pipes with sufficient force to achieve separation of muscle tissue from connective tissue and to break muscle tissue down to the desired particle size. Conventional lobe-type and progressive cavity food pumps, for example, as manufactured by Roots, G&H, and Mono (Mono Pumps Ltd, Manchester, U.K.), can be employed. Alternatively, any fluid pump capable of generating sufficient outflow of fluid can be employed, including, for example, centrifugal pumps (e.g., radial flow, axial flow and mixed flow pumps), jet pumps, peristaltic pumps, or vane pumps. Alternatively, any pump or other device capable of imposing stress (tensile, shear or normal) so as to preferentially cause mechanical failure in the muscle tissue, as opposed to the connective tissue, can be used. One particularly useful pump is a low shear pump, e.g., a piston pump. Pressure differential can range from negligible to the limit of the pump, although near the pressure limit, excess shear can be introduced to the detriment of process efficiency. In some embodiments, a bell suction for the pump may be provided to prevent pump cavitation and resultant shear.

In certain embodiments, the reservoir tanks can be replaced with coils of pipe which can hold the slurry in a relatively undisturbed state or serve as a conduit through which the slurry can be pumped. The constriction can be contained within the coil of pipe, e.g., where the space in which the system is to be placed is small.

The pipes 20 and 22 each have a reduction fitting 26 of a diameter less than that of the remainder of the pipe such that fluid being pumped through the pipe is subjected to an acceleration. This acceleration results in the contents in the pipe being subjected totensile and shear forces. The amount of tensile stress is selected to be below the level where a substantial fraction of the connective tissue will fail (e.g., tear) and above a level where a substantial amount of the muscle tissue will fail (e.g., tear). The ratio of tensile to shear stress is selected to be high. In general, the suitable amount of stress is a function of the hydration or dwell time of the animal tissue in the aqueous solvent and the strength of the muscle tissue of the particular animal. For example, beef is generally "tougher" than fish, and will generally require higher amounts of stress, longer hydration period, and/or both to achieve similar results. Thus, where space is available, tissue can be processed by leaving it to hydrate for longer periods of time and applying lower amounts of stress. Conversely, where space is at a premium, e.g., on a factory trawler, hydration times can be kept to a minimum (e.g., about one minute) or avoided, and the applied stress can be higher to accommodate the higher strength of the muscle tissue than might otherwise be achieved through longer hydration times.

Figure 4A:
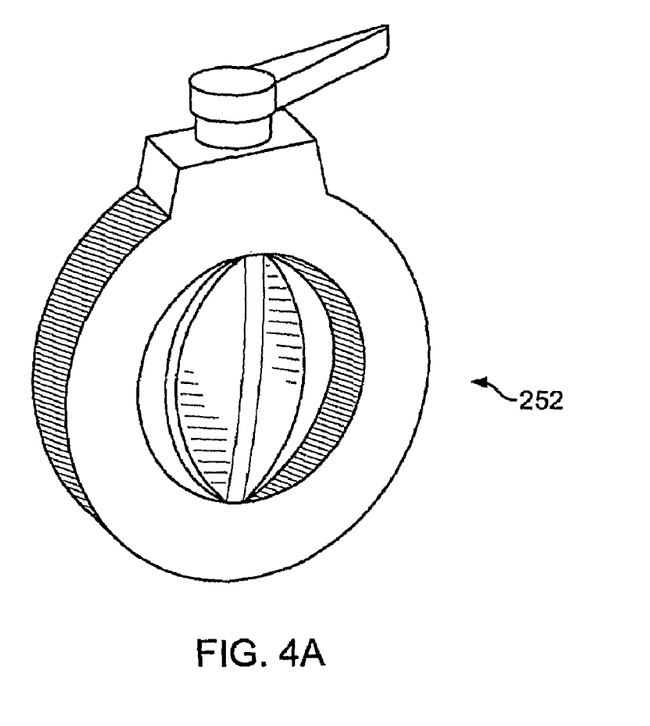
FIG. 4A is a schematic diagram of an embodiment of a valve.
Figure 4B:
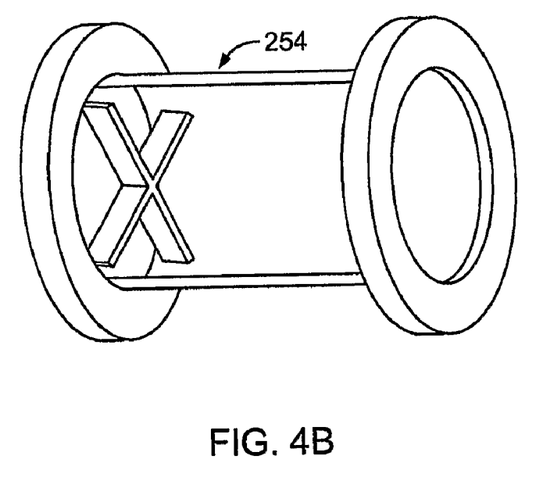
FIG. 4B is a schematic diagram of an embodiment of a baffle.

Generally, the tensile and shear forces are provided by pumping the contents of the reservoir tank through a pipe that is configured to result in a rapid acceleration of the fluid, e.g., a pipe which has a constriction therewithin. Such an acceleration can be achieved, for example, by causing the cross-sectional area through which the fluid is pumped to decrease, resulting in an increase in the fluid flow speed. FIGS. 4A and 4B illustrate exemplary alternative constriction configurations that will result in such an increase in flow speed, including a valve 252 (FIG. 4A), e.g., a ball valve, and a baffle 254 (FIG. 4B). In certain embodiments, elbows in the pipe, e.g., one or more 90 or 45 degree fittings, or one or more helices or coils in the pipe may also function as a constriction, as they can apply sufficient stress to fluids passing therethrough. Embodiments may include one or more of any of these configurations. In some embodiments, the acceleration that results from the pumping of fluid from the reservoir tank into the pipe is sufficient to effect the separation of muscle from connective tissue, and no additional configuration is required.

One particularly useful combination is a positive displacement pump and a ball valve constriction. One advantage of such combination is that it allows for the concentration of the total stress in the form of tensile stress (rather than from shear stress), which typically preferentially causes failure in the muscle. Another advantage is that it allows the operator direct and separate control of the energy delivered per unit time and of the flow rate. For example, partially closing the ball valve against flow generated by a perfectly positive displacement pump affects (increases) only the energy delivered. Closing a ball valve against a centrifugal pump, on the other hand, will decrease flow and may, in some ranges of closure, increase the total energy delivered per unit time (due to changes in flow and viscosity). In some closure ranges, such closure against a centrifugal pump can decrease power consumption, and consequently reduce the rate at which work is delivered.

Further referring to FIG. 3, a terminal pipe 24 leads from the reservoir tank 16 to a refiner 40, which is described in more detail below. As shown in this embodiment, pipe 24 has a pump 34 for pumping fluid through the pipe 24, and has a reduction fitting 26, although the terminal pipe may optionally lack one or both of these features. A collection channel 50 extends below refiner 40 for collecting protein paste that passes through a screen 42 on the refiner 40, while an outflow tray 56 collects material that does not pass through the screen 42 and is expelled from the terminal end 44 of the refiner.

Separation Devices

Figure 5:
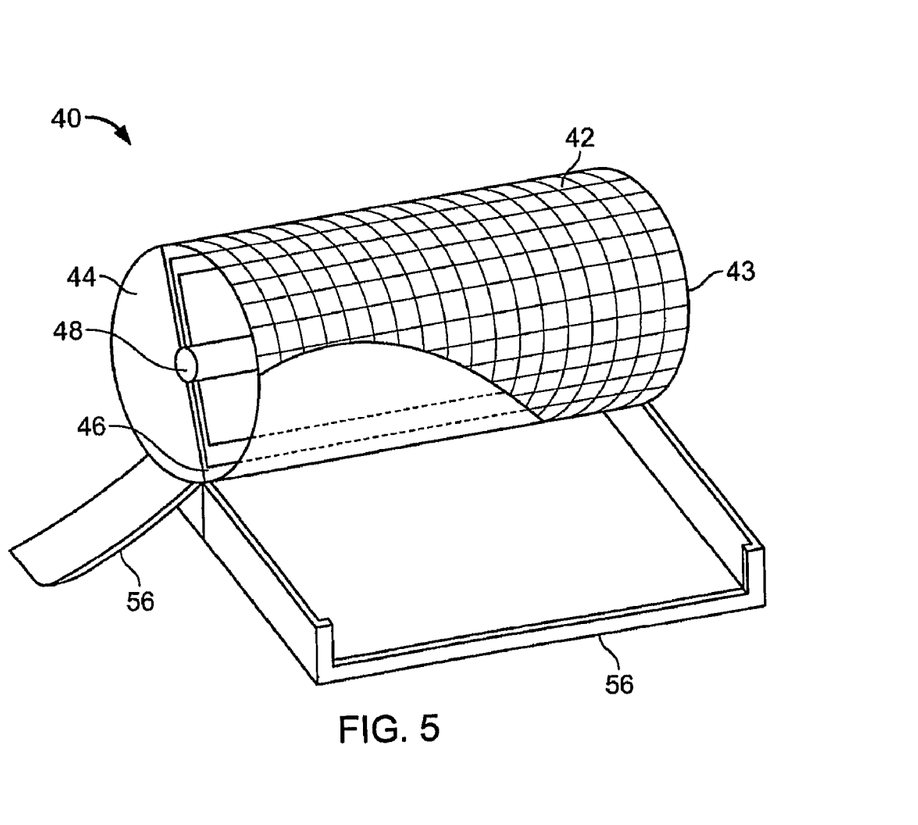
FIG. 5 is a perspective view, partially cut-away, of an embodiment of a refiner.

A separation device is illustrated in FIG. 5, in which the separation device is a refiner 40 that includes a cylindrical screen 42 having a introduction end 43 and a terminal end 44. A series of paddles 46 extend from a central axis shaft 48 radially toward the screen 42 and are configured to rotate within the cylindrical screen 42. The paddles extend in a generally longitudinal direction along the interior of the cylindrical screen 42. The refiner is configured such that, as the animal tissue slurry is introduced into the introduction end 43, the protein paste can pass through the mesh of the screen 42, while the larger connective tissue fragments cannot so pass. The paddles 46 have a pitch such that, as the paddles rotate within the cylindrical screen 42, they move the material that does not pass through the screen from the introduction end 43 to the terminal end 44 of the cylindrical screen, where it is expelled onto the outflow tray 56. The refiner can have one, two, three, four or more paddles. Generally, the greater the number of paddles, the lower the RPM's required to handle a given capacity of slurry, as described below.

The rotation of the paddles in certain embodiments forces or assists in the proteins and/or muscle particles' passing through the screen 42. The amount of force generated by the paddles is determined by the rotational speed of the paddles, the relative stiffness of the paddle material, and the proximity of the paddles to the screen. The paddles in certain embodiments rotate at speed no more than about 1000 RPM (e.g., no more than about 700 RPM, 500 RPM, 450 RPM, 400 RPM, 350 RPM, 300 RPM, 250 RPM, 200 RPM, 150 RPM, 125 RPM, 100 RPM 90 RPM, 80 RPM, 70 RPM, or 60 RPM). In some embodiments there is no natural upper limit on paddle rotation speed, e.g., paddle rotation speed can be greater than about 1000 RPM. The gap between the paddle and the screen may be no larger than about 50 mm (e.g., no larger than about 40 mm, 30 mm, 20 mm, 10 mm, 5 mm, 2.5 mm, 1 mm, 0.5 mm, or too small for conventional measurements). In certain embodiments, gaps larger than about 50 mm may be employed (e.g., larger than about 60 mm, 70 mm, or 80 mm). In other embodiments, there is no substantial distance between the screen and the paddle, i.e., the paddle contacts the screen. In some embodiments, the refiner will permit the setting of the distance between the paddles and the screen. In certain embodiments, the refiner is a straight-type refiner. In certain embodiments, the refiner is a taper-type refiner. Suitable refiners include, for example, those manufactured by Brown International, of Covina, Calif. (e.g., the Brown model 202,402), or FKC Ltd., of Port Angeles Wash. (e.g., the FKC models 350 and 450). These machines are also sometimes referred to as pulpers, polishers, and/or finishers. Any size can be used depending upon the desired capacity. Generally, the smaller the degree to which the muscle tissue is reduced in particle size, the smaller the refiner that is required for a given capacity, and conversely, the larger the particle size of the muscle tissue, the larger the refiner that is needed to achieve the given capacity.

The size of the gaps in the screen mesh determines, at least in part, the particle size of the material that can pass through the screen. Generally, the gaps in the screen mesh are selected such that the majority of the protein component will pass through the screen, while the majority of the connective tissue remains within the cylindrical screen where it is expelled by the action of the paddles. In certain embodiments, the screen is formed of a mesh having holes no larger than about 2 mm (e.g., no larger than about 1.75 mm, no larger than about 1.5 mm, no larger than about 1.25 mm, no larger than about 1 mm, no larger than about 0.75 mm, no larger than about 0.5 mm, and no larger than about 0.25 mm, no larger than about 0.05 mm). In certain embodiments, holes larger than about 2 mm may be employed (e.g., holes larger than about 2.5 mm, holes larger than about 2.75 mm, holes larger than about 3 mm, holes larger than about 3.5 mm, holes larger than about 4 mm). For example, when processing fish, the holes in the screen mesh typically range from about 0.25 mm to about 1.5 mm.

In certain embodiments, the refiner can include a cylindrical screen, which itself rotates, for example, to produce a centrifugal force that aids in moving the proteins through the screen. The paddles in such a refiner can be held relatively motionless, e.g., not be rotated, or can themselves rotate, typically in a direction opposite the screen.

In alternate embodiments, the separation device can include a flat or curved screen and one or more paddles that sweep across the surface of the screen, sweeping off connective tissue and, optionally, assisting in forcing protein, e.g., muscle protein, through the screen. In still other embodiments, the separation device can include a flat or curved screen, for example, a flat or curved screen set at an angle from horizontal, that is moved from side to side, e.g., vibrated or shaken, which allows gravity to cause the protein particles to pass down through the mesh. Optionally, the movement of the screen combines with the angle of the screen to move material that collects on the screen to an edge of the screen and optionally off the edge.

In another embodiment, the separation device can be a belt-type separator, such as a Baader™ 607, with a drum equipped with small holes (the current minimum standard is 1.3 mm, however, smaller holes are technically possible and available on a custom-made basis). The separation device can be equipped with an injection device having a nozzle that has been machined to fit on the outside of the drum, e.g., the nozzle contacts an element made of ultra high molecular weight plastic that contacts the drum. The element has a curved side that complements the curve of the drum. The nozzle connects the separation device to the reservoir tank and/or pipes configured to rapidly accelerate the slurry. This nozzle delivers the slurry through a rectangular orifice, or a series of small perforations across an area whose width is less than the length of the drum. The Baader™ 607 equipped with a Baader™ part number 9100001228 is an example of such an assembly for delivery of the slurry to the center of the drum. Delivery of the slurry into the center of the drum (generating even distribution) is preferred to delivery to the edges of the drum.

The reservoir tanks, pipes, pumps and separation devices are all formed of materials suitable for handling food, including, for example, stainless steel (e.g., type 304 stainless steel, type 316 stainless steel), carbon steel, aluminum, glass, and/or plastics.

Recirculating Tank System

Figure 6A:
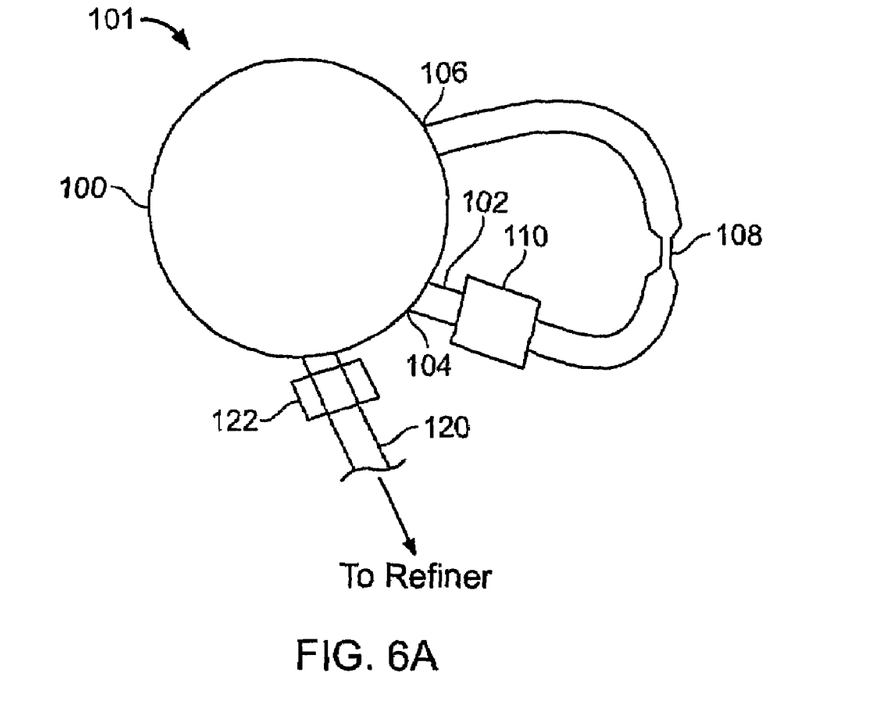
FIG. 6A is a top view of a portion of an embodiment of a system.

In certain embodiments, multiple hydration and acceleration steps are carried out in the same reservoir tank, pipe, and pump. FIG. 6A illustrates such a recirculating reservoir 101, which includes a reservoir tank 100 and a recirculating pipe 102 that is connected at an inlet 104 and an outlet 106 to the tank 100. A restriction fitting 108 is located in the recirculating pipe 102 and has an inner diameter less than that of the remainder of the pipe 102. A pump 110 is located in the recirculating pipe 102 and is configured to pump fluid from the tank 100 through the recirculating pipe, including the restriction fitting 108, and back into the recirculating reservoir tank 100. A discharge pipe 120 leads from the reservoir tank 100 to the refiner, not illustrated. A discharge pump 122 is operative to pump fluid from the reservoir tank 100 through the discharge pipe 120. This embodiment allows for the repeated hydration and acceleration of animal tissue without the need for additional tanks, pipes and pumps, which permits a reduction in the capital investment required to set up such a system and reduces the floor space required to effect the separation of protein.

Figure 6B:
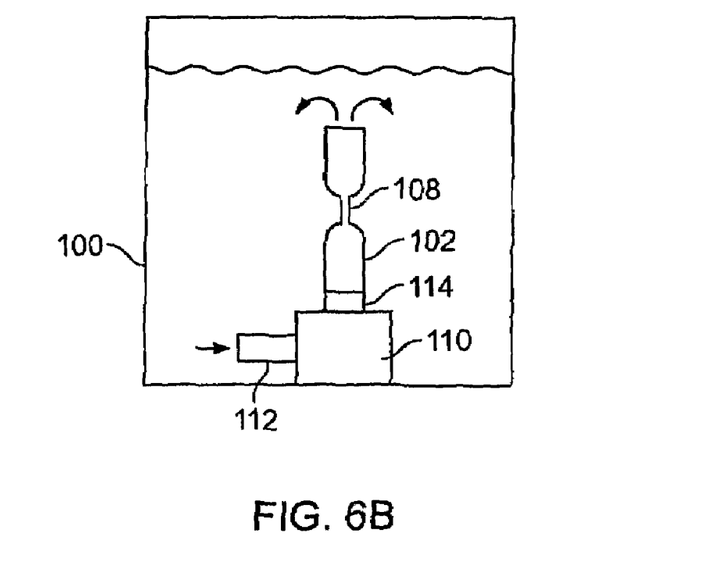
FIG. 6B is a perspective view of a cross-section of an embodiment of a system.

Alternatively, as illustrated in FIG. 6B, the slurry can be accelerated within tank 100, e.g., by a submersible pump 110 that continuously forces a portion of the slurry through a constriction 108 in pipe 102, or, e.g., by paddles that accelerate the slurry. For example, pump 110 can be located at the bottom of the tank, and can circulate slurry that enters pump 110 through inlet 112 and exits the pump through outlet 114 into pipe 102 contained within tank 100 and having a constriction 108 therein. The pipe can discharge the slurry directly back into the tank. The pipe can, for example, be in the middle of the tank or along a side of the tank. In this embodiment, the slurry does not leave the tank (avoiding, e.g., leaks), and a separate pipe directs the finished product to the separation device.

In such a continuous system, the average period of time that a particle remains in the tank, e.g., in a hydration period, is a function of the tank volume and the pump flow.

Separated Protein Slurry

Further referring to FIG. 1, the separated protein slurry 324 that results from this process in certain embodiments contains water, soluble proteins and insoluble proteins. A substantial amount of the insoluble proteins are in myofibrillar filament form (e.g., more than about 50%, 60%, 70%, 75%, 80%, 90%, or 95% of the insoluble proteins in the slurry are in myofibrillar filament form). For example, substantially all of the myosin in the product can be in myofibrillar filament form (e.g., at least 75%, 80%, 90%, or 95% of the myosin). The separated protein slurry may, in certain embodiments, contain a relatively small amount of connective tissue. For example, in certain embodiments, the protein slurry may contain less than about 10% by weight, relative to the amount of protein in the slurry, connective tissue (e.g., less than 10%, 5%, 4%, 3%, 2%, or 1% by weight, relative to the amount of protein in the slurry, connective tissue).

The amount of undissolved protein, e.g., insoluble protein, can be measured using methods known in the art. For example, by first separating, e.g., by filtering or pelleting (e.g., by centrifugation) undissolved protein from the separated protein slurry, followed by quantifying, e.g., by weighing, of the undissolved protein. Once the undissolved protein has been separated, the amount of myofibrillar protein present can be measured. Sarcoplasmic protein can be extracted from the undissolved protein pellet by standard techniques. Myofibrillar protein can be extracted from the remaining fraction by standard techniques (e.g., resuspension in a phosphate buffer, homogenization, and centrifugation) and quantified, e.g., by weighing. The amount of the dissolved protein remaining in the separated protein slurry after removing the undissolved protein, can be measured, e.g., after removing, e.g., by evaporating, the aqueous liquid. The quantification can be carried out by, e.g., weighing the protein.

Sources of Animal Tissue

The animal tissue from which the separated protein slurry is derived can be obtained from any animal food source, e.g., fish, shellfish (e.g., shrimp, crab, lobster, krill, clams, muscles, scallops, and crayfish), squid, poultry, beef, lamb, or pork. In certain embodiments, the source of animal tissue is the parts of the animal that remain after other parts of the animal have been removed for retail sale, for example, the parts of the fish that remain after the fish has been filleted, or the skeletons of chickens after the chickens have been butchered. In some instances, such material is not used for human food. In some embodiments, the animal tissue may have already undergone some processing, and may contain a large amount of connective tissue, e.g., more than 70%, e.g., more than 80%, e.g., more than 90% of connective tissue by weight.

In certain embodiments, the animal tissue source is subjected to preliminary treatment steps appropriate for the animal type. For example, where fish are to be processed, the fish are generally gutted and the head removed. An external belt/drum deboner or mincer (e.g., as manufactured by Baader™, Toyo, or Bibun), e.g., having hole sizes of between about 1.3 mm and about 8 mm, may be employed, for example, where a large portion of the connective tissue is comprised of sheets such as skin and muscle sheaths, as occurs, e.g., in white fish. Optionally, the fish is filleted, with either the fillet or the remaining fish portions being utilized as the animal tissue.

Where the food source is poultry, beef, lamb, or pork, the animal is generally butchered, the skin is optionally removed, and the carcass is cut into sections. The sections are optionally deboned (e.g., mechanically deboned or manually deboned and, optionally, including grinding and/or crushing the bones and separating, e.g., by filtering, bone from the remainder of the animal tissue) and the cartilage is removed. In certain embodiments, the sections are deboned by blasting the sections with high-pressure water to separate the muscle and connective tissue from the bone and cartilage. For example, the section can be placed on a screen and moved past an array of nozzles spraying high-pressure water (e.g., at least 250 PSI, at least 275 PSI, at least 300 PSI, at least 325 PSI, at least 350 PSI, at least 375 PSI, at least 400 PSI). The screen has a mesh sized to permit the particles of soft tissue (e.g., muscle and connective tissue) to pass through, while being large enough to retain substantially all of the bones. Such treatment may prevent the release of blood and other unwanted material from the bones and cartilage that would occur during crushing that is carried out during many current separation techniques. The resultant tissue can then be added to the reservoir tank for hydration, optionally with grinding or mincing (e.g., using a grinder, Beehive or Paoli separator, or silent cutter such as a Stephan silent cutter) occurring prior to adding the tissue to the reservoir tank.

Pre-Separation Processing

Optionally, fat content in animal tissue can be reduced prior to hydration and/or further processing. It is possible to reduce fat of the tissue in the reservoir tank prior to processing due to the lower density of fat relative to protein and due to low emulsification capacity of protein at and around the isoelectric point of the protein (approximately 5.5). Fat can be reduced, e.g., by chilling the suspension, e.g., to close to freezing temperature, e.g., to about −1° C. or lower, e.g., to about −28° C., reducing the pH of the suspension, e.g., to close to the isoelectric point of the protein, e.g., to pH of about 5.5, and/or bubbling air through small perforations in a pipe or grid into the suspension (see, e.g., Example 5), and removing the fat. Fat removal can be performed in a continuous and/or batch process.

Post-Separation Processing

Once protein, e.g., muscle protein, e.g., myofibrillar and/or sarcoplasmic protein, has been separated from connective tissue, the protein can be further processed as desired. During separation processing described herein, substantially all muscle protein can remain undissolved, e.g., at least 50% of muscle protein can remain undissolved. The amount of undissolved protein can be measured, e.g., by filtering or pelleting (e.g., by centrifugation) undissolved protein from the separated protein slurry. The amount of dissolved protein remaining in the separated protein slurry after removing the undissolved protein, can be measured, e.g., after removing, e.g., evaporating, aqueous liquid. After separation, the undissolved protein, e.g., muscle protein, can, for example, be solubilized by mixing it with water and raising the pH to dissolve the protein as described in U.S. Pat. No. 6,136,959, or can be solubilized at a pH below about 3.5, as described in U.S. Pat. Nos. 6,005,073, 6,288,216 and 6,451,975. These patents are hereby incorporated by reference in their entireties. In either case, as the connective tissue has already been separated from the muscle proteins, there may be no need for filtering, pumping, or centrifuging the proteins. The dissolution and coagulation of the proteins can be carried out in a single tank, eliminating the need to transfer the proteins. The separated protein slurry need not be subject to a filtering step, although in certain embodiments, additional filtration may be desired. The result is the enablement of more gentle treatment and easier handling of the protein, and the reduction of or elimination of the creation of foam. The protein can also be used to make a paste made of fish protein.

In certain embodiments, the separated protein slurry is dewatered. Dewatering can be accomplished by running the material through one or more screens followed by decanting or squeezing out the water using a screw press. Dewatering may also be accomplished by centrifugal separation of the water, spray drying, evaporating, or freeze drying.

In certain embodiments, muscle tissue is separated from connective tissue, and the particle size of the muscle tissue is reduced to a size sufficiently small that it can be injected directly into intact muscle foods (e.g., meat), for example, to enhance the water-holding capacity, texture, and/or taste of the muscle food. In certain embodiments, the muscle particles are mixed with minced muscle to control water holding capacity and/or texture of the minced muscle, e.g., gelation.

In certain embodiments, where the animal tissue being processed contains either no extraneous material that is per-se objectionable (e.g., bone or cartilage) or contains an acceptable amount of such (e.g., a low level of connective tissue), the tissue can be ground to an appropriate size (e.g., a size whereby the connective tissue is sufficiently small to avoid any problems, e.g., where the connective tissue fragments are sufficiently small to be injectable and/or not detrimentally affect the taste and/or texture of the final meat product) and run through the hydration/acceleration process to further reduce the particle size of the tissue. The resulting fluid, which includes soluble proteins, insoluble proteins, and optionally some connective tissue, can then be combined with muscle foods (e.g., intact muscle), for example, by injection into the muscle food or by tumbling with the muscle food, optionally, under vacuum. In some embodiments, the fluid is added to muscle foods as is, without inclusion of any further additives. The fluid can optionally include additives, e.g., salts, buffers, acids, and/or bases, added to aid in the distribution and/or solubilization of the proteins. The majority of the insoluble proteins can be in myofibrillar filament form (e.g., more than about 50%, 60%, 70%, 75%, 80%, 90%, or 95% of the proteins in the slurry are in myofibrillar filament form). For example, substantially all of the myosin in the product can be in myofibrillar filament form (e.g., at least 75%, 80%, 90%, or 95% of the myosin). This process can be used, for example, to increase the protein content of muscle foods. Without being bound to any particular theory, this method of increasing protein content of muscle foods, takes advantage of reduced viscosity of muscle protein in the added fluid. This process can also be utilized for other purposes, e.g., to increase the water content of muscle foods and/or to replace water lost by muscle foods upon freezing and thawing. For example, fish can lose between about 10% and 20% of its water content in the freezing process, and the fish tissue may at that point not be able to retain pure water injected into the tissue. The presence of the protein can result in retention of water by muscle foods.

EXAMPLES

The invention is further described in the following examples, which do not limit the scope of the invention described in the claims.

Example 1

Gutted and headed fish were ground to a size of about ¼ inch and then mixed with water in a ratio of 1 part water to 1 part fish and placed in a reservoir tank. The fish tissue was allowed to sit in the water for 5 minutes, during which time the muscle tissue at least partially hydrated. The resulting slurry was pumped using a positive displacement pump through 3-inch ID pipe at a rate of 5 ft/sec. The pipe had a 3-inch long restriction fitting having an inner diameter of 1 inch. As the slurry was pumped through the pipe and reduction fitting, the slurry accelerated, applying force to the particles of fish tissue within the slurry and tearing the hydration-weakened muscle tissue from the connective tissue. Muscle tissue was also torn apart, reducing the particle size of the muscle particles, The pipe directed the slurry into a second reservoir tank, where the slurry incubated for an additional 5 minutes, allowing for additional hydration of the muscle tissue. The slurry was then pumped through the restriction fitting and into another reservoir tank. This process was repeated through ten cycles to achieve the desired particle size and/or particle size distribution.

The slurry was then introduced into a refiner having screen holes of 0.25 mm. The paddles of the refiner were set to run at 60 RPM. The proteins and water passed readily through the screen, while the connective tissue, which had not been reduced in size to the same extent, did not pass through the screen. The protein and water were collected to yield a separated protein slurry having the consistency of white glue.

Example 2

A beef brisket was cut into 1-inch pieces and ground through a ¼-inch plate meat grinder. The resulting ground meat was then placed in water in a ratio of 1 part meat to 2 parts water to form a slurry. The slurry was agitated in a Cuisinarte food processor with a 3-inch diameter impellor having rounded edges (to reduce shear) at about 1750 RPM for five one-minute intervals, with two minutes hydration time between agitations. The slurry was then separated with a 1.5 mm swept screen, aided with an internal water spray. Connective tissue was caught on the screen, while separated muscle proteins that were suspended in the water passed through the screen holes.

Example 3

Chinese white shrimp, deheaded and with the shell on, were chopped along with an equal amount of ice in a Stephan chopper for three minutes. The chopped shrimp were then agitated with an additional five parts water with a mixing hook (which includes several loops arranged into a whisk) having a 3-inch diameter, for 30 minutes at 120 RPM. The resulting slurry was then separated in a swept 1.5 mm screen aided with an internal water spray. Shells and connective tissue were caught in the screen, while suspended muscle tissue passed through the screen holes.

Example 4

Fillets of pollock were chilled to 32° F. and cubed into ½-inch pieces. Samples were then mixed with water (in ratios described below) and chopped in a Stephan cutter, model PCM12, with a two-bladed curved knife attachment at high speed for four minutes to reduce the particle size of the pollock fillets to a point at which the resulting slurry had a paste-like consistency.

A first batch of cubed pollock was mixed with ½ part water and formed into the slurry as described. The slurry was tumbled with 8 parts pollock fillets in a vacuum tumbler, at which point the fillets absorbed or otherwise retained the bulk of the slurry. After tumbling, the mixture was put into a standard 16.5 fish block frame, an aluminum c-shaped frame used in forming fish sticks, with a Beck Liner®, a cardboard liner designed to allow water to enter the liner. This was frozen in a plate freezer at a pressure of about 10 PSI to 0° F. The resultant fish block had a higher amount of protein than it would have had absent the combination with the slurry, producing an enhanced recovery fish block, and retained its form upon thawing.

A second batch was used to rehydrate previously frozen fish, which lost some water upon freezing. The batch was mixed with 3 parts water, reduced to a paste, and injected into previously frozen (and subsequently thawed) fillets of Pacific cod to a total marinade inclusion of 10% by weight, thus replacing some of the moisture lost in the freeze/thaw process and increasing the protein content of the fillets.

A third batch was treated in the alkaline process described in U.S. Pat. No. 6,136,959, and the resultant isolate was adjusted to a protein content of 5% and injected into Pacific cod fillets at an inclusion of 15% by weight through an injection needle with an ID of 1 mm, thus increasing the water and protein content of the fillets.

Example 5

One hundred pounds of Tilapia fillet trimmings, which included large pieces of non-muscle protein and significant quantities of fat, were reduced in size in a Baader 695 belt-mincer to 5 mm pieces. These were mixed with water (including ice) at a solids content of 3% and the pH was reduced to 5.5 using HCl. This mixture was agitated gently in a circular tank. Air was injected into the tank through a pipe with 4, ¼-inch perforations at 15 PSI. Large quantities of fat were thus separated. This fat rose to the surface and then migrated to the center of the tank and was easily removed by skimming.

The pH was then raised to 8.0 and pumped directly at 50 gpm through a ball valve with a pressure drop of 100 psi into a Brown 204 refiner with 0.5 mm holes.

This product was treated in the alkaline process described in U.S. Pat. No. 6,136,959, and the resultant isolate was adjusted to a protein content of 3.5% and injected into Pacific halibut fillets at an inclusion of 20% by weight using a Fumako injector. These fillets showed reduced cook loss compared to a phosphate based marinade, and the characteristic flavor of tilapia fat could not be detected.

Example 6

Chicken breast meat was ground through a ¼-inch plate in a conventional meat grinder producing 300 pounds of ground chicken meat. The meat was mixed with water to a solids content of 3%. The pH was adjusted to 5.3 with HCl. The fat separated more easily than expected and coagulated into yellow globules, which were easily skimmed from the reservoir tank. The slurry was agitated across a ball valve restriction for 30 minutes. The valve was adjusted so as to increase the amperage of the pump drive motor by 1.2 amps@ 480 volts.

Because of the large diameter of the connective tissue, and the tendency of the tendons to braid themselves into "ropes" of even larger diameter, the paddles in the Brown refiner used in this process were set at a relatively large 15 mm gap with the screen. To compensate for the large gap, refiner RPM was increased to 700 RPM. This setup proved superior in reducing the amount of connective tissue in the product relative to the small gap-low RPM methods used in fish.

Other Embodiments

A number of embodiments of the invention have been described. Nevertheless, it will be understood that various modifications may be made without departing from the spirit and scope of the invention. For example, while a refiner is disclosed above as a means for separating the protein from the connective tissue, a screen, conventional refiner, strainer, or other device for sorting large particles from smaller particles, or strong particles from weaker particles, can be employed.

As another example, while pumps have been described for moving fluid through pipes, fluid could instead be moved through the pipes through the effects of gravity or pressure, e.g., by pressurizing a column of air above the surface of the fluid Accordingly, other embodiments are within the scope of the following claims.

What is claimed is:

1. A method of separating muscle protein from connective tissue, the method comprising:
    (a) reducing the size of the muscle tissue which contains both muscle protein and connective tissue;
    (b) mixing the muscle tissue with an amount of water to create a first slurry;
    (c) pumping the first slurry through a first pipe and then through at least one constriction, thus causing the first slurry to accelerate in the direction of the flow of the first slurry such that a substantial fraction of the connective tissue will not tear and a substantial fraction of the muscle protein will tear;
    (d) separating the muscle protein from the connective tissue using a separation device; and
    (e) solubilizing the separated muscle protein in a second slurry by raising or lowering the pH of the second slurry to a point at which at least 75% of the separated muscle protein dissolves;
    wherein the completion of steps (a)-(e) results in a separated muscle protein of a sufficiently small size that it can be injected directly into intact muscle foods.

2. The method of claim 1 wherein step (b) further comprises waiting for a period of time sufficient to allow the muscle tissue to hydrate.

3. The method of claim 2, wherein the period of time is at least 1 minute.

4. The method of claim 1 wherein step (a) further comprises reducing fat content of the muscle tissue.

5. The method of claim 4, wherein the step of reducing fat content of the muscle tissue further comprises reducing the temperature of the first slurry.

6. The method of claim 1, wherein the first slurry is housed within a tank and a pipe is configured to circulate the first slurry out of the tank, through the at least one constriction, and back into the tank.

7. The method of claim 1, wherein the at least one constriction comprises a reduction in an inner diameter of the pipe.

8. The method of claim 1, wherein the at least one constriction comprises a baffle.

9. The method of claim 1, wherein the at least one constriction comprises a valve.

10. The method of claim 9, wherein the valve is a ball valve.

11. The method of claim 1, wherein the method further comprises repeating steps (a)-(d) at least five times.

12. The method of claim 1, wherein the method further comprises repeating step (c) at least five times.

13. The method of claim 1, wherein the pH of the amount of water is between about 5.0 and about 9.5.

14. The method of claim 1, wherein the separation device is a refiner comprising a screen configured to allow a substantial portion of the muscle protein to pass through the screen and to prevent a substantial amount of the connective tissue from passing through the screen.

15. The method of claim 14, wherein the screen is formed of a mesh having apertures no larger than about 5 mm.

16. The method of claim 14, wherein the screen is formed of a mesh having apertures between about 0.05 mm and about 0.5 mm.

17. The method of claim 14, wherein the screen is formed of a mesh having apertures no smaller than about 0.05 mm.

18. The method of claim 14, wherein the refiner comprises a paddle configured to rotate within a cylindrical screen.

19. The method of claim 18, wherein the paddle rotates at a speed of between about 60 RPM and about 1000 RPM.

20. The method of claim 1, wherein the muscle tissue comprises fish, shellfish, squid, poultry, beef, lamb, or pork tissue.

21. The method of claim 1, comprising, prior to step (a), removing bones from the muscle tissue containing muscle protein and connective tissue to form deboned muscle tissue.

22. The method of claim 2, wherein the period of time is at least 30 minutes.

23. The method of claim 1 wherein at least 50% of the separated muscle protein remains undissolved during steps (a)-(d).

24. The method of claim 1, wherein substantially all of the separated muscle protein remains undissolved during steps (a)-(d).

25. The method of claim 1, wherein step (e) comprises raising the pH of the second slurry to at least about 10.5.

26. The method of claim 1, wherein step (e) comprises lowering the pH of the second slurry to between about 2.5 and about 3.5.

27. The method of claim 1, wherein the amount of water used to create a first slurry contains substantially no salt.

28. The method of claim 1, wherein the water to muscle tissue ratio in step (b) is 0.1:1 to 100:1.

29. The method of claim 1, further comprising, after step (e), the step of dewatering the separated muscle protein.

30. The method of claim 1, wherein the second slurry further comprises additives selected from the group consisting of salts, buffers, acids and bases.

31. The method of claim 1, wherein the separation device is a rotary or a tangential screen.

32. The method of claim 1, wherein step (a) comprises cutting, grinding or mincing.

33. The method of claim 1, wherein the step of pumping is performed by a pump selected from a group consisting of a shear pump, a piston pump, a positive displacement pump, a centrifugal pump, a jet pump, a peristaltic pump, a rotary pump, a diaphragm pump, a vane pump, and a reciprocating pump.

34. A method of combining separated muscle protein with an intact muscle food product, the method comprising:
    (a) reducing the size of the muscle tissue which contains both muscle protein and connective tissue;
    (b) mixing the muscle tissue with an amount of water to create a first slurry;
    (c) pumping the first slurry through a first pipe and then through at least one constriction, thus causing the first slurry to accelerate in the direction of the flow of the first slurry such that a substantial fraction of the connective tissue will not tear and a substantial fraction of the muscle protein will tear;
    (d) separating the muscle protein from the connective tissue using a separation device;
    (e) solubilizing the separated muscle protein by raising the pH of a second slurry comprising an aqueous solvent and the separated muscle protein to a point at which at least 75% of the separated muscle protein dissolves; and
    (f) combining the solubilized, separated muscle protein with an intact muscle food product.

35. The method of claim 34, wherein the composition of the separated muscle protein comprises less than about 4% by weight of connective tissue, relative to the amount of muscle protein in the second slurry.

36. The method of claim 34 wherein the step of combining the muscle protein with the intact muscle food product comprises tumbling or injecting.

* * * * *